United States Patent [19]

Goldstein

[11] Patent Number: 5,281,131

[45] Date of Patent: Jan. 25, 1994

[54] SELECTIVE EMISSIVE BURNER

[75] Inventor: Mark K. Goldstein, La Jolla, Calif.

[73] Assignee: Quantum Group, Inc., San Diego, Calif.

[21] Appl. No.: 636,132

[22] Filed: Dec. 31, 1990

Related U.S. Application Data

[63] Continuation-in-part of Ser. No. 864,088, May 16, 1986, abandoned, which is a continuation-in-part of Ser. No. 48,961, May 11, 1987, Pat. No. 4,793,799, which is a continuation of Ser. No. 659,074, Oct. 5, 1984, abandoned.

[51] Int. Cl.$^5$ .............................................. F23D 21/00
[52] U.S. Cl. ................................. 431/253; 431/328; 431/354; 126/39 J
[58] Field of Search ............... 126/39 J, 39 BA, 39 D, 126/39 R, 39 G, 39 H, 39 K; 431/320, 354, 328, 253

[56] References Cited

U.S. PATENT DOCUMENTS

| | | | |
|---|---|---|---|
| 4,059,385 | 11/1977 | Gulitz et al. | 431/12 |
| 4,067,681 | 1/1978 | Reid et al. | 126/39 J X |
| 4,201,184 | 5/1980 | Scheilder et al. | 126/39 J |
| 4,597,734 | 7/1986 | McCausland | 431/328 |
| 4,793,799 | 12/1988 | Goldstein et al. | 431/79 |
| 4,906,179 | 3/1990 | Nitta | 431/264 |

Primary Examiner—Larry Jones

[57] ABSTRACT

Embodiments of gas-fired appliances which generate selective emissive radiation, in such apparatus, gas is burned in a porous ceramic surface combustion burner. The high temperature surface of the burner includes a narrow band quantum emitting substance such as rare earth metal oxides. Relatively shorter wavelength radiation from this quantum emitting surface illuminates process targets having an absorption spectrum nearly matched to the emission spectrum of the burner surface, for a variety of application such as cooking. The selected emission may be passed through a glass top stove to heat a pot with an absorptive bottom or may pass on through a glass pot to heat the food directly.

2 Claims, 2 Drawing Sheets

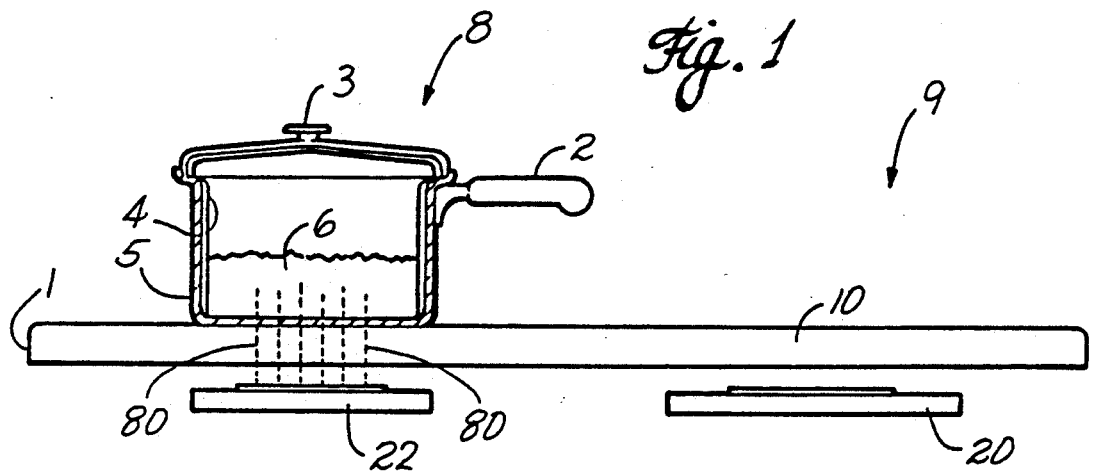
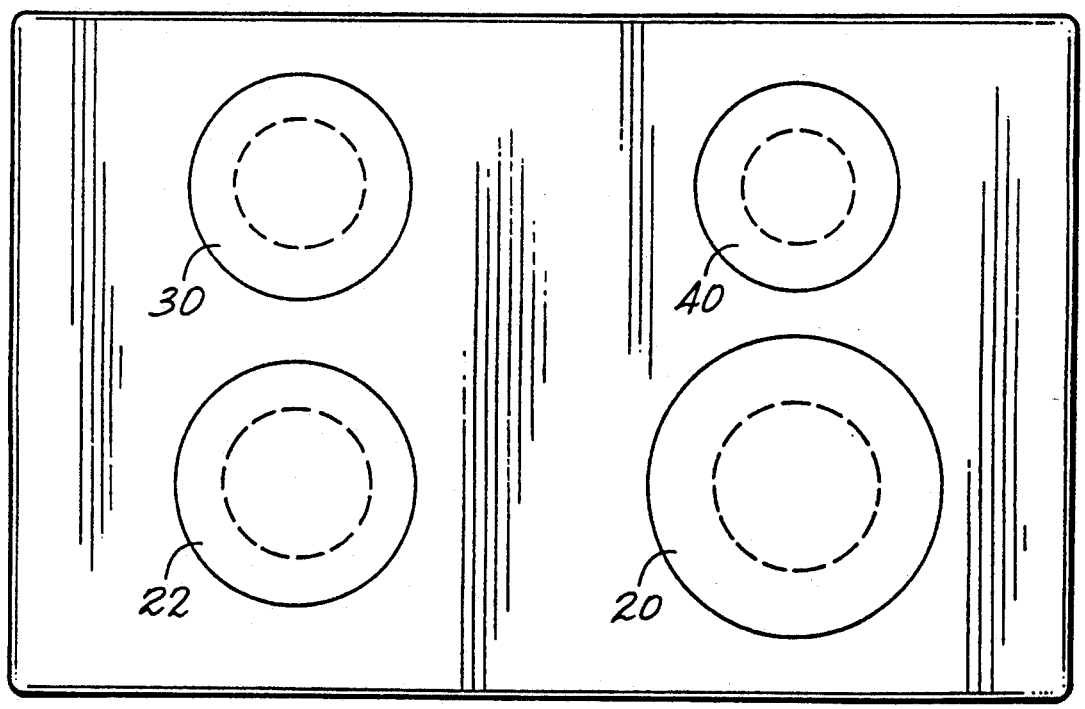

SELECTIVE EMISSIVE BURNER

CROSS REFERENCE TO RELATED APPLICATIONS AND DISCLOSURE DOCUMENTS

This application is a continuation in-part of U.S. patent application Ser. No. 864,088 filed May 16, 1986 (now abandoned). It is also a continuation-in-part of U.S. patent application Ser. No. 48,961 filed May 11, 1987, now U.S. Pat. No. 4,793,799, which is a continuation of U.S. patent application Ser. No. 659,074 filed Oct. 5, 1984. (now abandoned) which was a National application corresponding to International Application NO. PCT/US84/01038 filed Jul. 3, 1984, which was a continuation-in-part claiming priority of U.S. patent application Ser. No. 517,699 filed Jul. 25, 1983 (now abandoned).

The application is also related to Disclosure Document Ser. No. 156,490 filed on or about Sep. 22, 1986, and Disclosure Document Ser. No. 167,739 filed Apr. 13, 1987, No. 239577 received Nov. 16, 1989, and apparently renumbered by the U.S. Pat. and Trademark Office as Disclosure Document Ser. No. 168,234. The subject matter set forth in these prior applications and disclosure documents is hereby incorporated by reference.

BACKGROUND OF THE INVENTION

Thermocouples have long been used in gas-powered appliances for generating a small amount of electric current. Typically a thermocouple is placed in the pilot flame to generate just enough power to keep a fuel control valve open. This operates as a safety precaution so that the absence of power from the thermocouple cuts off the flow of fuel. There is sufficient power from such a thermocouple for opening such a valve, which is commonly reset manually, let alone operate a blower or auxiliary devices.

Electric power can also be generated by photovoltaic devices. U.S. Pat. No. 3,188,836 by Kniebes describes use of emissive radiation to generate power to control a valve for a gas lamp. This was, in effect, a replacement for a thermocouple.

Rather different technology involves use of photoelectric devices which change resistance, for example, when illuminated. These devices, in effect, as switches for controlling current from sources of electric power. These systems are not self powered since the photoelectric devices do not generate electricity. Exemplary of use of photoelectric devices in appliance control can be seen in U.S. Pat. No. 2,306,073.

U.S. Pat. No. 3,331,701 by Werth provides the first known description of a thermophotovoltaic power producing device using silicon cells. The efficiency of silicon solar cells has been optimized to produce electric power with an efficiency of about 2.6% using a tungsten filament heated to about 2200° K. as the heat source. This would be no more than marginally suitable for a self-powered gas fired appliance as provided in practice of this invention. U.S. Pat. No. 4,906,179 by Goldstein, et al., describes the use of selective emissive burner in self powered appliances.

This invention relates to burners containing narrow band selective emitters on their emissive surface(s) which is the subject of a co-pending application. The radiant energy may be used in a variety of applications such as gas range cooking, and oven cooking by matching the near IR emission of selected supermitters to that for a strongly absorbing region by the food. The key to the use of these devices is an optical container that transmits the selective emissions.

Currently gas cooking equipment often create pollution in the home or commercial facility. In addition an open flame is often the cause of fires, injuries, and even worse. The move to energy conservation after the first oil shock and the continuing rise in energy cost has lead to new construction techniques and retrofits that make commercial building, factories and dwellings nearly air tight. Thus the need for radiant cooking with lower pollution emissions and thus the need for efficient energy use such as is possible with selective emitters. Other devices that use selected photon wavelengths can also be constructed on this same principal e.g. photochemical reactors.

BRIEF DESCRIPTION OF THE DRAWINGS

FIG. 1 schematically illustrates a range top system;

FIG. 2 is a top view of a four burner range top;

DESCRIPTION OF THE PREFERRED

Figure 3:
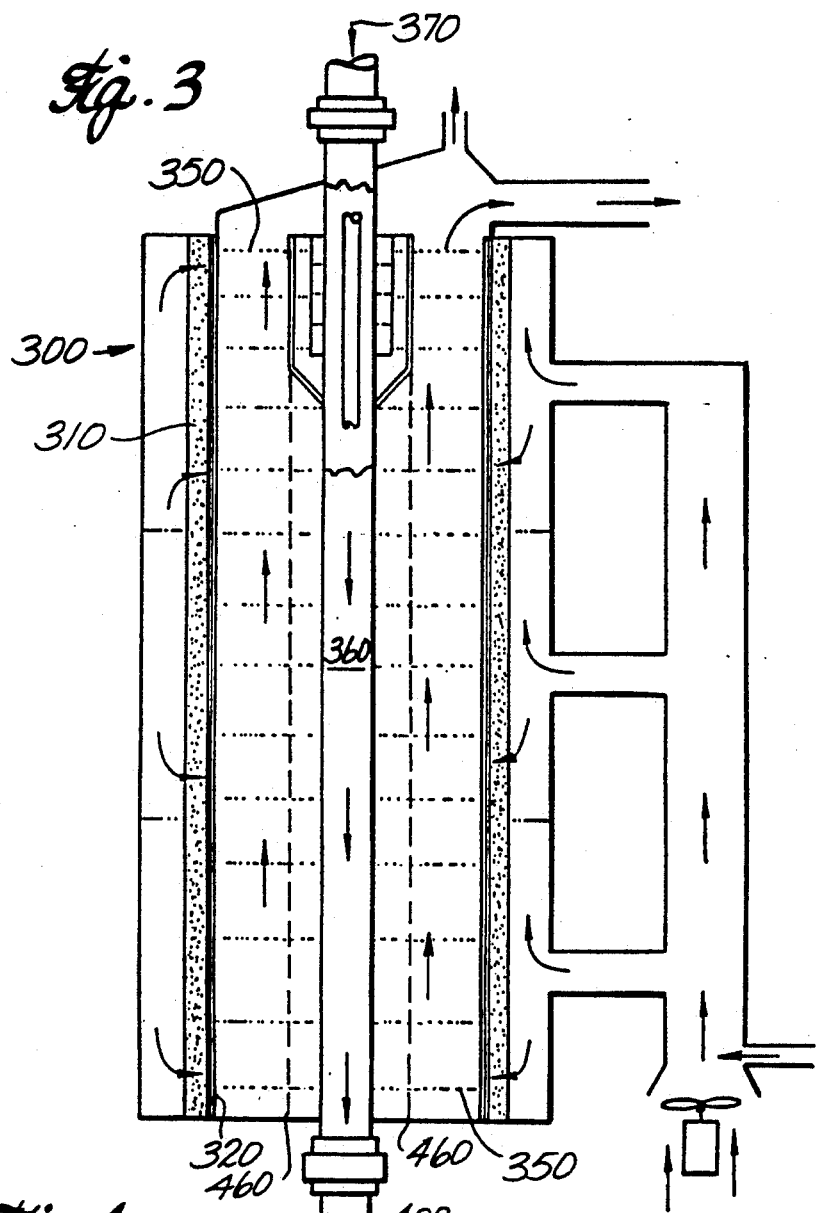
FIG. 3 is a photochemical reactor utilizing the burner structure of the instant invention.
Figure 4:
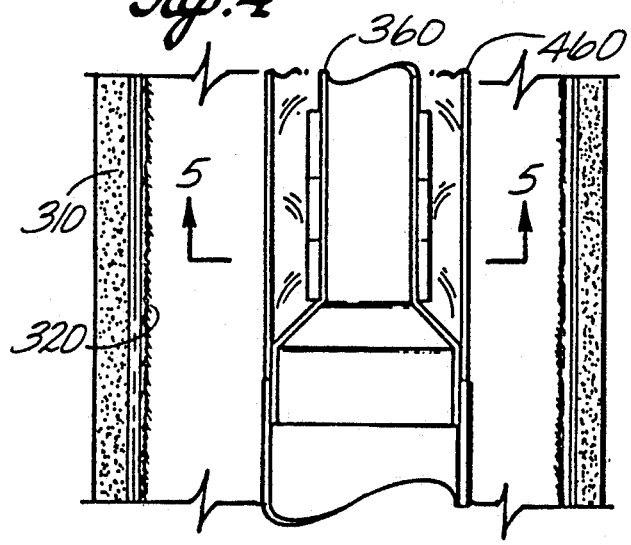
Figure 5:
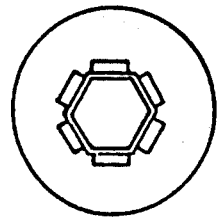

FIG. 1 illustrates schematically one representative range top system (9) which has it cooking energy requirement supplied by spectrally selective photons (80) generated by the emissive burner 22 or 20 which contains a special superemitting ceramic. The photons (80) pass through the glass or ceramic top (1) and through the bottom of the glass or ceramic pot (7) heating the food (6) directly. The inside surface (4) of the pot (8) is coated with a reflective material that contains the photons by internal reflections. The inside of the pot to (3) is also coated with the reflective coating (4). The pot (8) may be removed from the stove by a handle (2). The cooking system (9) consist of four burners, two of which can be seen in FIG. 1, i.e. 22 and 20. FIG. 2 illustrates the top view of the four burner stove (200) which includes three small burners 22, 30, and 45 and one large burner 20. The stove top (1) can be black or any color as long as it transmits the selective radiation (80). The pots and stove top may be made of glass ceramic or other transparent material that will not overheat respectively and will be transparent in the spectral region of the narrow band selective emitter, certain plastics may be used as cooking ware for example polycarbonate.

FIG. 3 illustrates a photochemical reactor (300) surrounded by a cylindrical burner (310) which has an emissive ceramic surface (320). The photons (350) pass through the transparent photochemical chamber 360 to interact directly with the reactants (370) to change reactants (370) into the desired photochemical products (400). The addition of a glass filter system to contain the flame may be inserted between the emissive surface 320 and the reactor 360 as shown in FIG. 3 by the dotted line (460).

Although a number of embodiments of selected emissive radiant burners have been described and illustrated herein, it will be apparent that many modifications and variations can be made. Thus, the specific arrangements of the parts for cooking equipment, photochemical reactors, LASER pump systems, and other like appliances may differ. Appreciably from the embodiments herein, it is, therefore, to be understood that within the scope of these appended claims the invention may be practiced otherwise than as specifically described.

What is claimed is:

1. A selective emitting combustion appliance comprising:
   a fuel oxidation mixing chamber;
   a porous burner section and an emissive surface on the burner section which contains a substance that emits narrow band quantum radiation when thermally stimulated;
   means for transmitting the narrow band radiation to an absorption material;
   means for operating and igniting the burner section;
   means for containing combustion products from the burner section; and
   a secondary chamber for containing reactants to be photochemically reacted to produce desired products.

2. A selective emitting combustive appliance as recited in claim 1 in which the secondary chamber contains a material which reflects radiation from its inner surface but will allow the selective radiation to pass into the chamber.

* * * * *